US007890834B2

(12) United States Patent
Blankenship et al.

(10) Patent No.: US 7,890,834 B2
(45) Date of Patent: Feb. 15, 2011

(54) APPARATUS COMPRISING A CIRCULAR BUFFER AND METHOD FOR ASSIGNING REDUNDANCY VERSIONS TO A CIRCULAR BUFFER

(75) Inventors: Yufei W. Blankenship, Kildeer, IL (US); T. Keith Blankenship, Kildeer, IL (US); Brian K. Classon, Palatine, IL (US); Ajit Nimbalker, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 909 days.

(21) Appl. No.: 11/765,921

(22) Filed: Jun. 20, 2007

(65) Prior Publication Data

US 2008/0320353 A1 Dec. 25, 2008

(51) Int. Cl.
*H03M 13/00* (2006.01)
(52) U.S. Cl. ...................... 714/755; 375/298
(58) Field of Classification Search ................. 714/755; 375/298
See application file for complete search history.

(56) References Cited

U.S. PATENT DOCUMENTS

2009/0086849 A1* 4/2009 Tsai et al. .................... 375/298

OTHER PUBLICATIONS

Rowitch, et al., "On the performance of hybrid FEC/ARQ systems using rate compatible punctured turbo (RCPT) codes", Communications, IEEE Transactions on vol. 48, Issue 6, Jun. 2000 pp. 948-959.
MCC Support, "Draft Report of 3GPP TSG RAN WG1 #48 v0.2.0," 3GPP RAN1#48, St. Julians, Malta, Mar. 26-30, 2007.
Ericsson, Motorola, Broadcom, ZTE, Nokia, Texas Instruments, Qualcomm Europe, Freescale, CATT, ITRI, NTT DoCoMo, Panasonic, Samsung, Mitsubishi, Nortel, "R1-071195, QPP Interleaver parameters," 3GPP RAN1#48, St. Louis (USA), Feb. 12-16, 2007.
3GPP TS 25.212 v6.4.0 (Mar. 2005): "Multiplexing and Channel Coding (FDD) (Release 6)". 17 pages.
Motorola, France Telecom, GET, Orange, "R1-061050, EUTRA FEC Enhancement," 3GPP TSG RAN WG1#44bis, Athens, Greece. Mar. 27-31, 2006, 14 pages.
Land, et al., "Partially Systematic Rate ½ Turbo Codes," Proc. 2nd Intl Symp. on Turbo Codes, Brest, France, pp. 287-290, Sep. 4-7, 2000.
Crozier, et al., "On Designing Turbo-Codes with Data Puncturing," Proceedings of the 2005 Canadian Workshop on Information Theory (CWIT 2005), Montréal, Quebec, Canada, Jun. 5-8, 2005., 4 Pages.
Motorola, "Redudancy Version Definition for Circular Buffer Rate Matching, R1-072138", 3GPP TSG RAN 1, May 11, 2007, XP002504204.
Samsung, Qualcomm, LGE, ITRI, "Circular Buffer Rate Matching for LTE, R1-072245", 3GPP TSG RAN Meeting 49, May 11, 2007, XP002504205.

* cited by examiner

*Primary Examiner*—Sam Rizk

(57) ABSTRACT

During operation of a transmitter a circular buffer is created where only column tops of the circular buffer are defined as a starting position for a redundancy version. Where the circular buffer is in sequence format, all possible redundancy versions are at positions $[K_{stream}/32](12 \times i + \sigma)$, $i=0, 1, \ldots, 7$ where $\sigma$ indicates the column index of the starting position of the first RV ($RV_0$).

31 Claims, 10 Drawing Sheets

RV definition with CB that has no dummy bits

$N_r \times 96$

RVs may start anywhere

■ represents starting of an RV with RVs evenly distributed
▨ represents bits from second parity stream
▩ represents bits from first parity stream
☐ represents bits from the systematic stream

- CB formed by reading bits out column-by-column
- Discontinuites appear wherever dummy bits were discarded
  - Lack of closed-form expression
  - Discontinuities vary with Code block size $K$, Rectangle size $K_{rect}$, and Column Permutation

RV definition with CB that has dummy bits

Circular Buffer Configuration $N_r \times 96$

All RVs start in the same row 0 1

▨ represents starting of an RV
— represents bits from the systematic stream
▦ represents bits from first parity stream
▥ represents bits from second parity stream
▨ ▩ ■ represents dummy bits

- Memoryless RV definition is key to efficiently start from any RV
- CB may be formed by reading bits out column-by-column
- Dummy bits discarded while reading out
- Each RV begins at the top of a column {2, 14, 26, 38, 50, 62, 74, 86}
  - RV(i) starts at bit position $pos_{vCB}(i) = \lceil K/32 \rceil \times (12i+2) = \lfloor (6 \times i+1) \times K_{rect}/16 \rfloor$

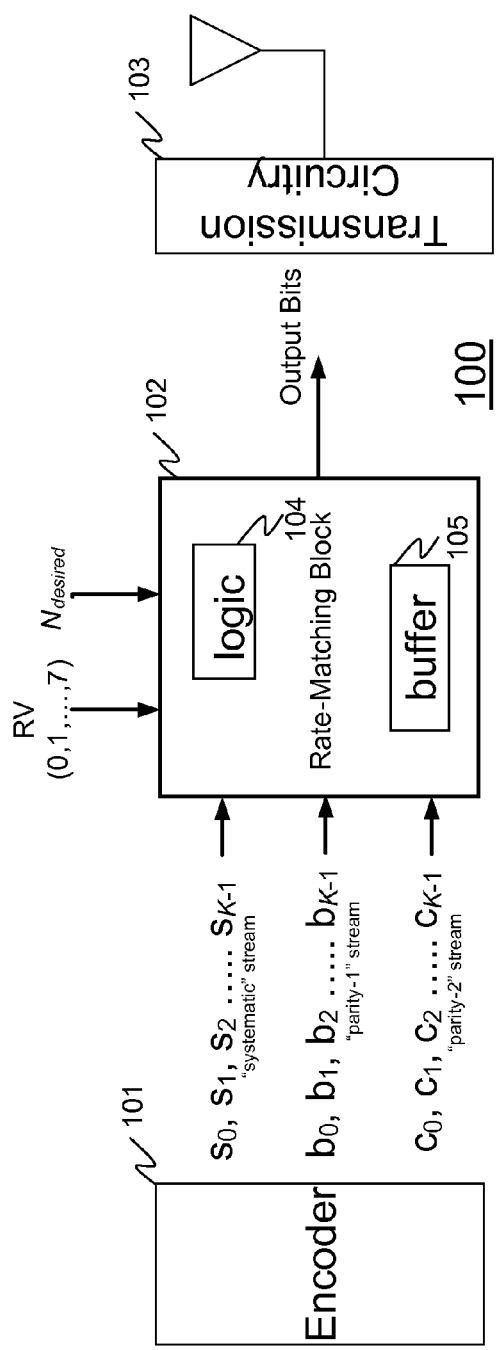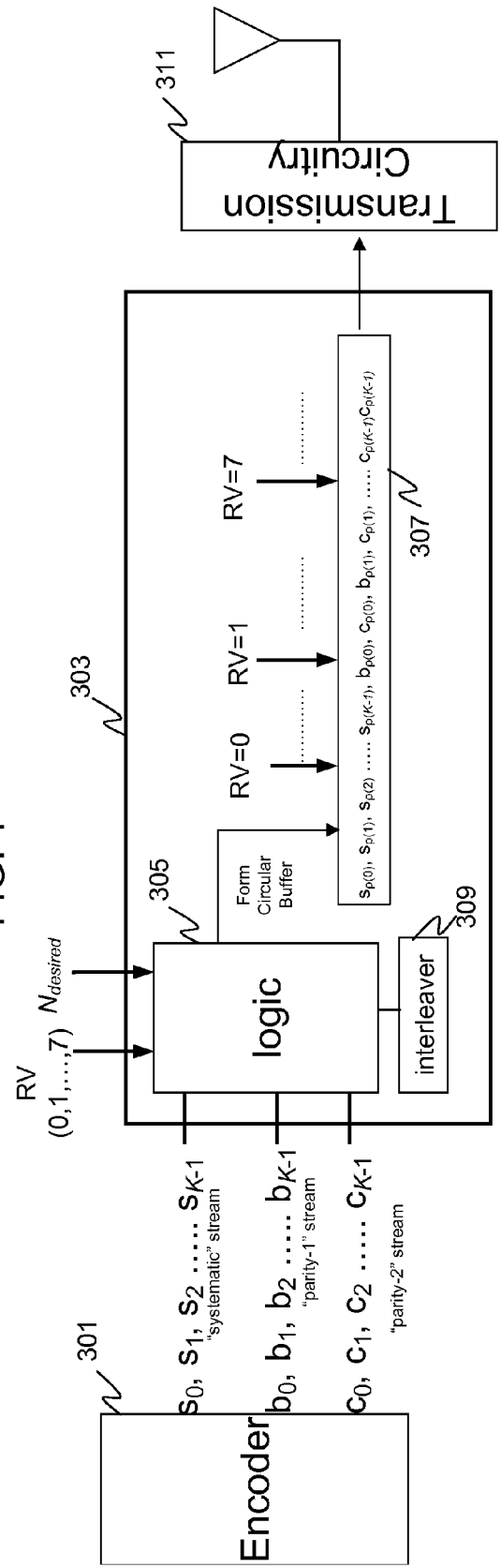

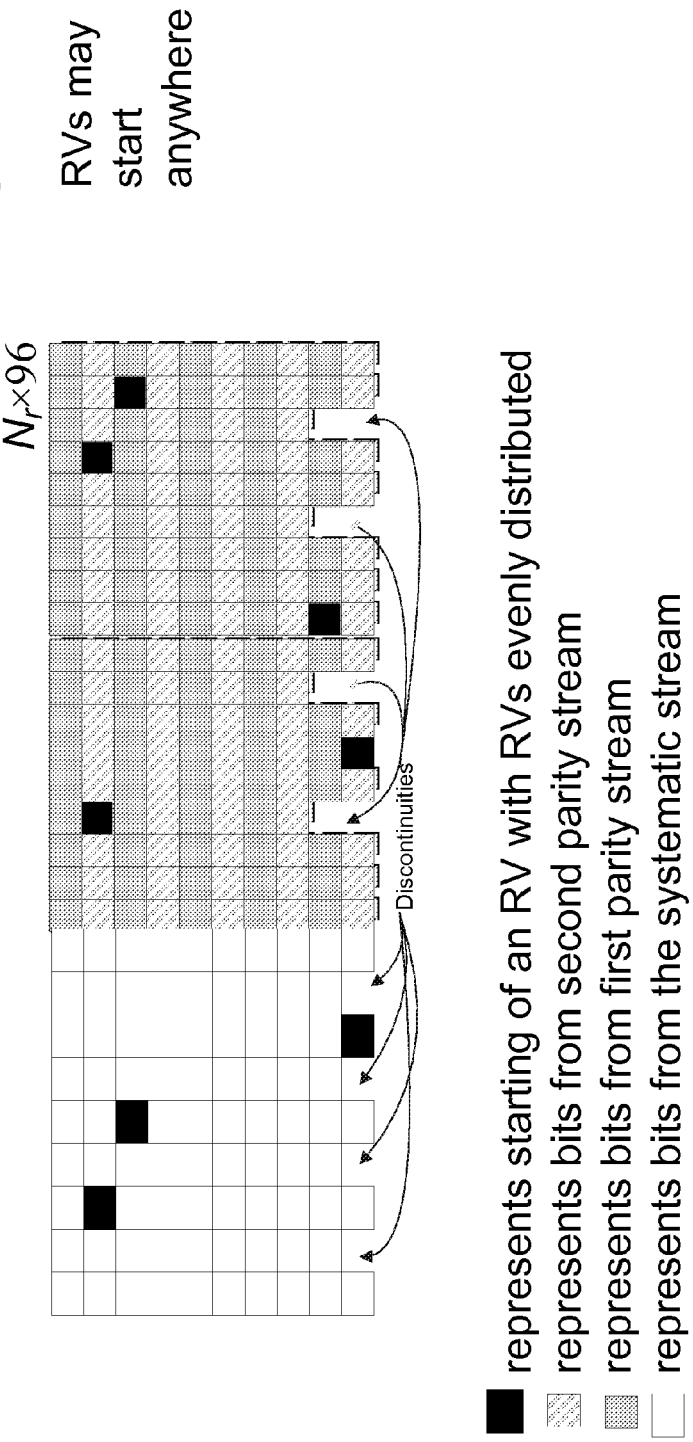

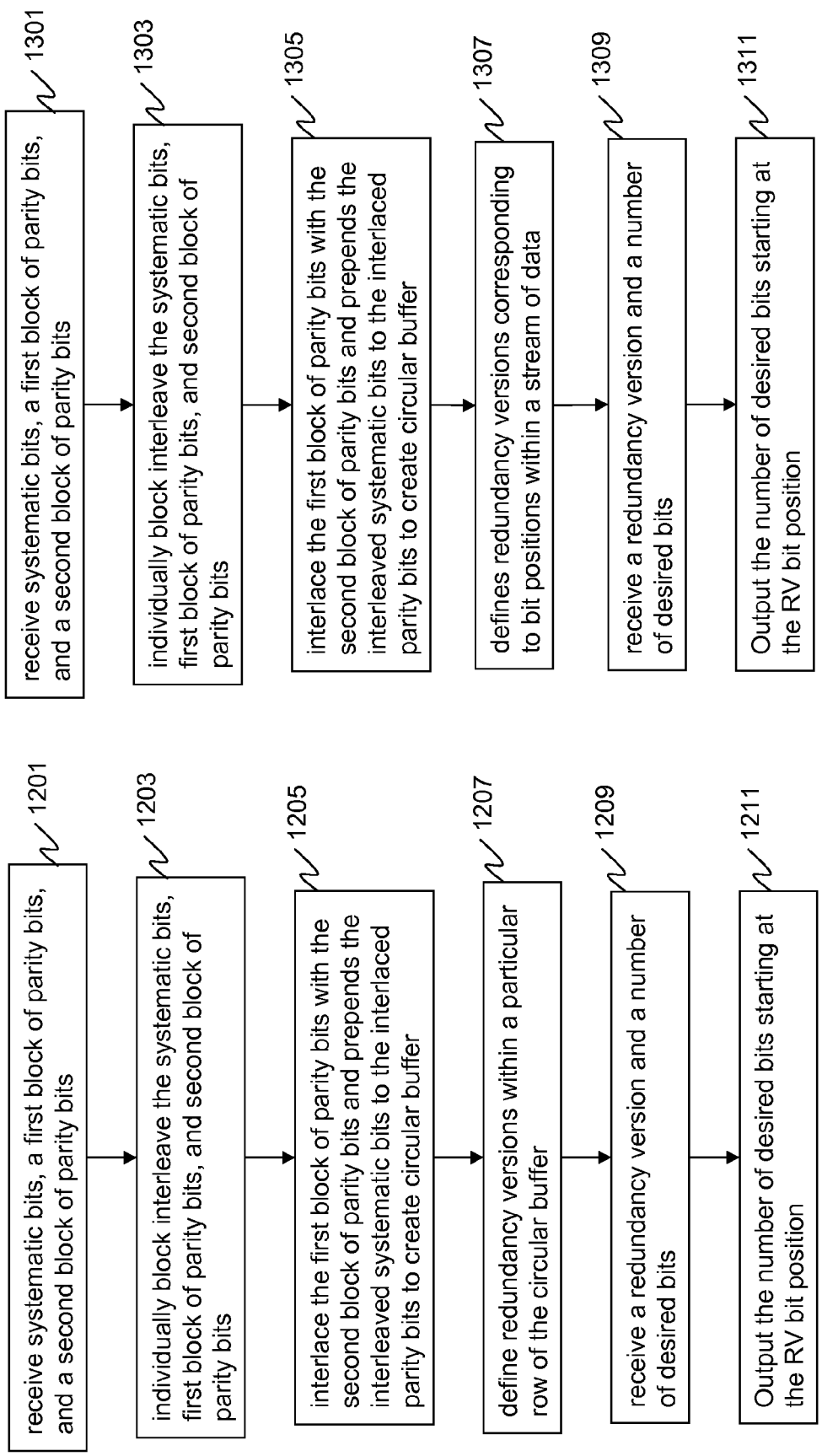

APPARATUS COMPRISING A CIRCULAR BUFFER AND METHOD FOR ASSIGNING REDUNDANCY VERSIONS TO A CIRCULAR BUFFER

FIELD OF THE INVENTION

The present invention relates generally to communication systems and in particular, to a method and apparatus for assigning redundancy versions to a circular buffer within a communication system.

BACKGROUND OF THE INVENTION

In a communication system, error control techniques are used to protect a signal against impairment during transmission over a channel. As part of such error control techniques, a codeword is produced for every information block. In order to match an over-the-air transmission rate, the codeword is resized via a rate matching algorithm before being sent over the physical channel. The rate matching algorithm provides a desired number of bits to be sent over the channel via puncturing or repetition of the codeword. The rate matching algorithm is important in that it can significantly impact the system performance and implementation efficiency.

If the system uses forward error correction (FEC) only, then only one transmission is needed for a given information block, and the rate matching algorithm only provides one version of the codeword. If the system uses Hybrid Automatic Repeat reQuest (HARQ) operation, then multiple transmissions may be needed for a given information block, and the rate matching algorithm may be required to provide different versions of the codeword (e.g., for incremental redundancy HARQ). HARQ degenerates to FEC if only one transmission is used for an information block.

One way to perform the rate matching function is to define puncturing/repetition patterns for every information block size and code rate the system may encounter. However, this method is inflexible. Moreover, it becomes impractical if the system involves thousands of information block size and code rate combinations, such as in a 3GPP communication system.

Another way to perform rate matching is to define a rule that steps through the codeword bits one by one and determines if a codeword bit should be punctured (removed) or repeated. Such a method has the benefit of flexibility and is defined in 3GPP Rel-99. However such a method suffers from implementation inefficiency. Further, there is no way to guarantee that the transmissions associated with a given information block do not overlap (i.e., orthogonal) for IR HARQ. Thus the system performance may suffer.

Alternatively, a circular buffer based rate matching algorithm may be designed to provide good performance with low implementation complexity. In this method, the codeword bits are rearranged to form a circular buffer. If $N_{desired}$ coded bits are needed for transmission, a length-$N_{desired}$ block of consecutive bits are taken from the circular buffer (wrapped around to the beginning if last bit of the circular buffer is reached). Therefore, puncturing and repetition can be achieved using a single method. The circular-buffering technique has advantages in flexibility, performance, and ease of implementation.

To realize the different codeword versions in a HARQ operation, a parameter such as redundancy version (RV) can be used as an input to the circular buffer based rate matching algorithm. The redundancy versions may define starting positions within the circular buffer for selecting the slice of the codeword for transmission.

In the prior art, the allowable starting positions of the RVs are evenly distributed over the circular buffer containing the sequence of codeword bits after rearrangement, which makes it difficult to implement each transmission of HARQ. Therefore, a need exists for a method and apparatus for assigning redundancy versions to a circular buffer within a communication system that improves the efficiency of the circular buffer based rate matching algorithm.

BRIEF DESCRIPTION OF THE DRAWINGS

FIG. 1 is a block diagram of a prior-art transmitter.
FIG. 3 is a block diagram of a transmitter.
FIG. 6 illustrates a dummy-removed circular buffer may presented in matrix format.
FIG. 12 is a flow chart showing operation of the transmitter of FIG. 3.
FIG. 13 is a flow chart showing operation of the transmitter of FIG. 3.

DETAILED DESCRIPTION OF THE DRAWINGS

Figure 2:
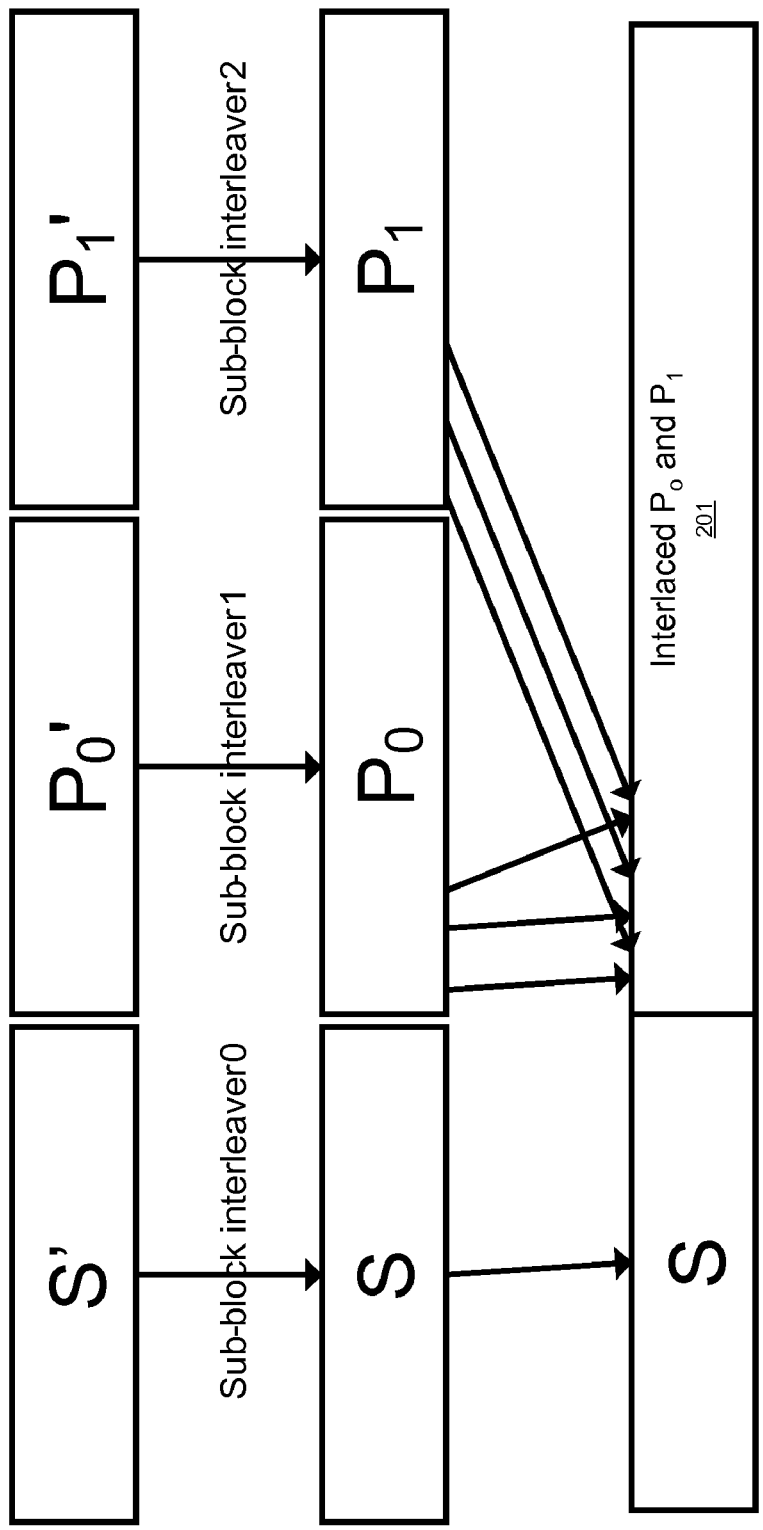
FIG. 2 illustrates sub-block interleaving and interlacing.

In order to address the above-mentioned need, a method and apparatus for assigning redundancy versions to a circular buffer within a communication system is provided herein. During operation a circular buffer is created where only redundancy versions are defined to start at the tops (i.e., on the first row) of the constituent sub-block interleavers. For example, with a total of eight redundancy versions, the redundancy versions would be placed at positions $[K_{stream}/32](12 \times i+\sigma)$, $i=0, 1, \ldots, 7$ where $\sigma$ indicates the sub-block interleaver column index of the position of the first RV ($RV_0$).

Defining RV positions as described above results in an easier implementation of HARQ. More particularly this technique allows a memoryless RV definition that is very useful in supporting a large number of input block sizes with circular buffer rate matching (RM). In particular, the above RV placement allows the implementation of a virtual circular buffer (i.e., a physical circular buffer is not implemented) which allows a desired number of bits to be directly selected from an encoder output stream starting from any RV in the circular buffer.

The present invention encompasses a method for assigning redundancy versions to a circular buffer. The method comprises the steps of receiving systematic bits, a first block of parity bits, and a second block of parity bits. The systematic bits, the first block of parity bits, and the second block of parity bits all comprise dummy bits. The systematic bits, first block of parity bits, and second block of parity bits are individually block interleaved and the first block of parity bits are interlaced with the second block of parity bits to create interlaced parity bits. The interleaved systematic bits are prepended to the interlaced parity bits to create a circular buffer and redundancy versions are defined to start in a particular row of the circular buffer. When a redundancy version (RV) and a number of desired bits are received, the number of desired bits are output starting at the RV bit position.

The present invention comprises an apparatus comprising an encoder outputting systematic bits, a first block of parity bits, and a second block of parity bits. Rate matching circuitry is provided receiving the systematic bits, first block of parity bits, and second block of parity bits and creating a circular buffer having dummy bits. A particular row of the circular buffer is used as redundancy versions (RVs), and the rate matching circuitry outputs non-dummy bits from the circular buffer to a transmitter starting at a particular RV. Finally, transmission circuitry is provided receiving the non-dummy bits and transmitting the non-dummy bits.

Finally, the present invention comprises an apparatus comprising an encoder outputting systematic bits, a first block of parity bits, and a second block of parity bits, each of length $K_{stream}$. The apparatus additionally comprises rate matching circuitry for receiving the systematic bits, first block of parity bits, and second block of parity bits and interleaving the systematic bits, first block of parity bits, and second block of parity bits. Logic circuitry is provided for defining redundancy versions (RVs) corresponding to positions within a stream of data at which to start outputting data. When eight RVs are used, the RVs are at positions $\lceil K_{stream}/32 \rceil (12 \times i + \sigma)$, $i=0, 1, \ldots, 7$, where $\sigma$ indicates the sub-block interleaver column index of the starting position of the first RV ($RV_0$). The stream comprises the interleaved systematic bits, and an interleaved and interlaced first and second block of parity bits. Finally, transmission circuitry is provided for receiving non-dummy bits starting at a particular RV and transmitting the non-dummy bits.

Turning now to the drawings, wherein like numerals designate like components, FIG. 1 and FIG. 2 illustrate the functionality of a circular buffer based rate matching method. More particularly, FIG. 1 is a block diagram of a transmitter and FIG. 2 illustrates sub-block interleaving and interlacing. During operation of transmitter 100, encoder 101 outputs a systematic bit stream and at least two parity streams. For this particular example, encoder 101 comprises a rate-⅓ turbo coder adopted in the 3GPP standardization. It is noted that the following concepts can be adapted to other types of error correction codes, such as turbo codes with other code rates, low-density parity check (LDPC) codes, convolutional codes, etc.

Encoder 101 outputs three streams corresponding to the systematic bit stream and the two parity streams. In certain cases the systematic stream may contain several (e.g., 4) bits that are not systematic, e.g., due to tail bits as for the 3GPP turbo code. (Tail bits are absent when tail-biting encoding is used.) The streams may also contain filler bits inserted prior to turbo encoding. For simplicity, all the bits in the systematic stream are referred to as systematic bits, and all the bits in the respective parity streams are referred to as parity 0 bits and parity 1 bits, respectively.

Rate matching circuitry 102 receives the streams output from encoder 101 and performs sub-block interleaving on each stream individually. This is illustrated in FIG. 2 where S', $P_0$' and $P_1$' are systematic bit stream, parity 0 bit stream and parity 1 bit stream, respectively. Each stream is rearranged (interleaved) with its own sub-block interleaver (not shown in FIG. 1 or 2) to produce S, $P_0$ and $P_1$. $P_0$ and $P_1$ are then interlaced with each other to produce interlaced $P_0$ and $P_1$ portion 201. A single output buffer 105 (also called circular buffer) is formed by storing the rearranged systematic bits S in the beginning followed by interlaced $P_0$ and $P_1$ portion 201.

For a desired code rate of operation, the number of coded bits $N_{desired}$ to be selected for transmission is calculated and passed to logic circuitry 104 as an input. Logic circuitry 104 simply reads out a length-$N_{desired}$ block of consecutive bits from the sequence the circular buffer (wrapped around to the beginning if last bit of the circular buffer is exceeded) from a certain starting point. Therefore, puncturing and repetition can be achieved using a single method. The circular-buffering technique has an advantage in flexibility (in code rates achieved) and granularity (in streams sizes). Circular buffer rate matching selects parity bits approximately evenly distributed over the code trellis irrespective of desired code rate of operation if the sub-block interleavers are designed properly.

FIG. 3 is a block diagram of transmitter 300. Transmitter 300 comprises encoder 301 and rate matching circuitry 303. Rate matching circuitry 303 additionally comprises logic circuitry 305 and memory 307. Logic circuitry 305 is preferably a microprocessor, microcontroller, digital signal processors (DSPs), or such other devices known to those having ordinary skill in the art. The particular operations/functions of logic circuitry 305 thus of transmitter 300 is determined by an execution of software instructions and routines. Memory 307 comprises a random access memory (RAM), dynamic random access memory (DRAM), and/or read only memory (ROM) or equivalents thereof, that is used as a circular buffer. Encoder 301 is preferably a rate-⅓ 3GPP turbo coder, however, the techniques described herein for operating transmitter 300 may be applied to other encoders, including, but not limited to turbo coders performing turbo coding with other code rates, with tail bits or no tail bits, tail-biting, binary or duo-binary turbo coders, with or without filler bits insertion, . . . , etc.

During operation encoder 301 outputs three streams corresponding to the systematic bit stream and the two parity streams. Logic circuitry 305 receives the streams output from encoder 301 and performs sub-block interleaving on each stream individually. Logic circuitry 305 then interlaces $P_0$' and $P_1$'. A single output buffer 307 (circular buffer) is formed by storing the rearranged systematic bits S in the beginning followed by interlaced $P_0$ and $P_1$.

Although the sub-block interleaver may be any permuter, usually a rectangle interleaver (also called block interleaver) of $N_r$ rows and $N_c$ columns is used for simplicity. The operations are straightforward if the stream size $K_{stream}$ of each stream is equal to the rectangle interleaver size $N_r \times N_c$ (i.e., the block is full). However, often the stream size is less than $N_r \times N_c$, thus ($N_r \times N_c - K_{stream}$) dummy bits are needed to fill up the block.

Figure 4:
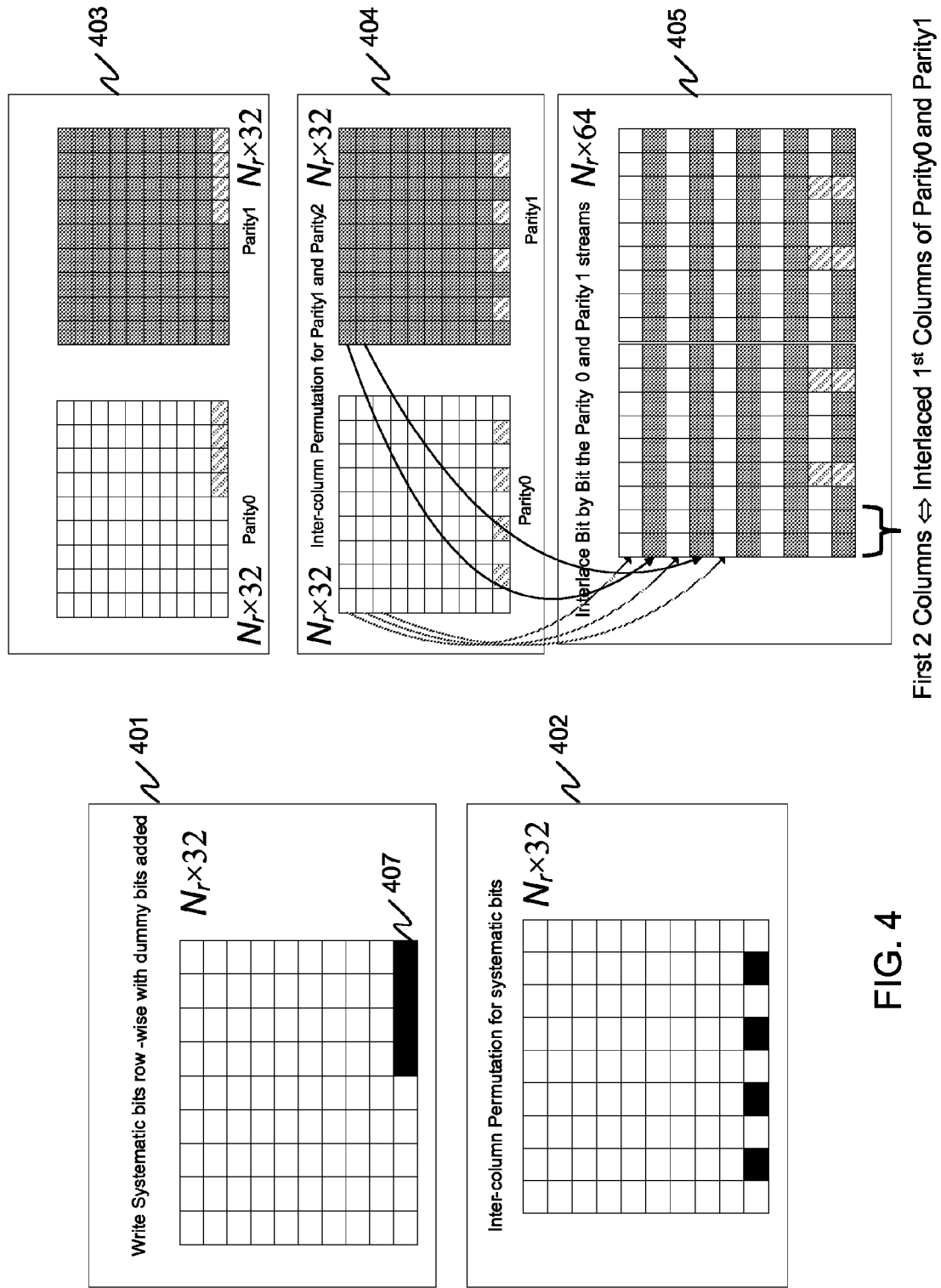
FIG. 4 and FIG. 5 illustrate sub-block interleaving and interlacing.
Figure 5:
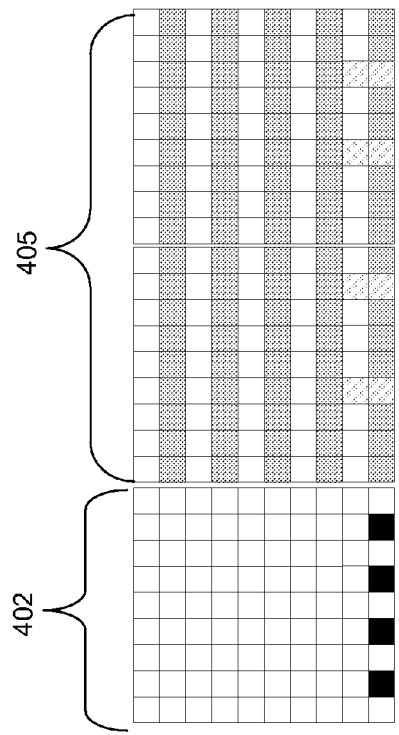

This process of forming the circular buffer is illustrated in FIG. 4 and FIG. 5 with 4 dummy bits inserted in each stream. With reference to FIG. 4, systematic bits 401, having dummy bits 407 added, are block interleaved to produce permuted systematic bits S 402. In a similar manner parity bits $P_0$' and $P_1$' 403 (having dummy bits added) are interleaved to produce parity bits $P_0$ and $P_1$ 404. The dummy bits are appended to the streams so that the block interleaver is full for each stream. $P_0$ and $P_1$ are interlaced to produce interlaced portion interlaced $P_0$ and $P_1$ portion 405. The two matrices S and $P_{0-1}$ are combined as shown in FIG. 5 and stored in buffer 307. Buffer 307 is read out column-wise, starting at the top of the matrix. Although in the description above the dummy bits are inserted after a stream, in certain embodiments, they can also be inserted before the stream.

During operation of transmitter 300, a number of coded bits $N_{desired}$ to be selected for transmission is calculated and passed to logic circuitry 305. Logic circuitry 305 simply reads out a length-$N_{desired}$ block of consecutive bits from the output buffer 307 (wrapped around to the beginning if last bit of the output buffer is exceeded) from a certain starting point. For Hybrid Automatic Repeat reQuest (HARQ) operation, a parameter (redundancy version (RV)) is provided to logic circuitry 305 to define the starting point within buffer 307 so that different sections of the buffer may be selected for transmission. Since FEC is equivalent to HARQ with one transmission only, FEC can also be defined with an RV value. Thus, logic circuitry 305 receives an RV value and the number of coded bits $N_{desired}$ to be selected for transmission. $N_{desired}$ bits are read out of buffer 307 starting at the position defined by RV. These bits are typically output to transmitter 311 for subsequent modulation and transmission.

It should be noted that the particular format for S, and the interlaced $P_0$ and $P_1$ are given above for illustration purposes, and may be formatted in several ways. For example, though the circular buffer is represented using a single dimension array, it is often useful to use a two dimensional matrix format for mathematical purposes.

If the dummy bits are kept in the circular buffer, it is called a dummy-padded circular buffer. The size of the dummy-padded circular buffer is equal to the summation of the input stream sizes and the total number of dummy bits inserted. As shall be clear from the context, the dummy-padded circular buffer may be in matrix format as illustrated in FIG. 5, or in sequence format (i.e., a single dimensional array or data stream) as illustrated in FIG. 2. If the dummy bits are removed, it is called a dummy-removed circular buffer. The size of the dummy-removed circular buffer is equal to the summation of the input stream sizes. Similarly, the dummy-removed circular buffer may be presented in matrix format as in FIG. 6 where discontinuities exist wherever dummy bits were removed, or in sequence format. Prior art RVs are approximately evenly distributed over the dummy-removed circular buffer, which makes it difficult to implement each transmission of HARQ as the precise RV starting position in the encoder output stream needs to be calculated using non-trivial operations for each case. In order to address this issue, a dummy-padded circular buffer 307 may be used to define a starting position for a redundancy version.

The following text may be useful in subsequent descriptions of rate matching techniques.

$K_{info}$ refers to the information block size (or length of the message packet)

$K_{FEC}$ refers to an input block size supported by the FEC encoder ($K_{FEC}$ is equal to the interleaver size for binary turbo code, and is equal to twice the interleaver size for duo-binary turbo code.)

$K_{filler}$ refers to the number of filler bits added to the information block to obtain an input size that is supported for the FEC encoder. $K_{filler}=K_{FEC}-K_{info}$.

$K_{stream}=K$ is referred to as stream length, which is equal to slightly greater than the $K_{FEC}$ depending upon the trellis termination method used in the turbo code. For the 3GPP turbo code, there are three streams, each of length $K_{stream}=K_{FEC}+4$, consisting of the systematic bits, Parity bits out of the first and second encoders, respectively, and 12 tail bits are distributed uniformly into the three streams.

$N_r$ refers to the number of rows in the sub-block interleaver used in the circular buffer.

$N_c$ refers to the number of columns in the sub-block interleaver used in the circular buffer.

$K_{rect}=N_r \times N_c$ is the dimension of the sub-block interleaver used in the circular buffer. In general $K_{rect}$ is chosen to be greater than or equal to $K_{stream}$ though it can also be chosen to be greater than or equal to $K_{FEC}$ if the filler bits are discarded as part of the rate-matching algorithm.

RV DEFINITION

For illustration, let us consider the case when the sub-block interleaver has 30 columns, and 8 RVs need to be defined. In this case, the buffer in FIG. 7 may have 90 columns which cannot be evenly divided into the eight RVs. It is difficult to find out the starting point of each RV in the encoder output stream (except $RV_0$ if $RV_0$ always starts from the beginning of the circular buffer). Assuming 8 evenly distributed RVs are needed, then the starting points of $RV_i$ is $K_{steam} \times 3/8 \times i$ (when necessary, brought to an integer value via operations such as round, floor, or ceil), if not including the dummy bits (i.e., dummy-removed circular buffer), i=0, 1, . . . 7. Alternatively, if the dummy bits are counted (i.e., dummy-padded circular buffer), then the starting point of $RV_i$ is $N_r \times N_c \times 3/8 \times i = N_r \times 90/8 \times i$ (when necessary, brought to an integer value via operations such as round, floor, or ceil). In either case, 7 RV starting points are almost always located in the middle of the $N_r \times 90$ rectangle if evenly distributed RV starting positions are desired. (A solution is to let all 7 RVs starting points to be in the top row of the $N_r \times 30$ rectangle thereby leading to slightly uneven distribution of the RVs in the buffer.) Note the following if the 30-column sub-block interleavers are applied to the 3GPP Long Term Evolution (LTE) standard.

If the RV starting points are stored, then a total of 188×7 starting points need to be stored, costing memory. Note that there are 188 QPP interleaver sizes, and 7 RVs that need to be stored for each size.

If the RV starting points are calculated on the fly, then two difficult operations need to be programmed in the hardware to find out the row and column indices of a point within the rectangle of the systematic bits or the rectangle of the parity-0/parity-1 rectangle. For example, if an RV starts at the L-th index within the systematic stream, then the two operations are:

Division to find out the column index=floor(L/_$N_r$) assuming the column index starts at 0. Since $N_r$ changes with $K_{stream}$ if $N_c$ fixed to 30, and $N_r$ is most likely not a power of 2, the division is not trivial in hardware.

Modulo to find out the row index=mod(L, $N_c$)=mod(L, 30). Since 30 is not power of 2, the modulo operation is also not trivial in hardware.

Using $N_c$=30 contributed to the difficulties of locating RVs to a large extent. Instead, it is preferable to have the total number of columns in buffer 307 to be a multiple of the total number of RVs supported to have evenly distributed RVs (though the RVs can still be defined unevenly). For example the subblock interleaver may use 32 columns when 8 RVs are to be defined. Often $2^c$ RVs need to be defined, where c is an integer. Thus, it is convenient to use $N_c=2^d$, where d is an integer greater than or equal to c. To further reduce complexity and minimize the amount of dummy bits, it is preferable to use the same value d for all information block sizes of the system. For example, constant d=5 (thus $N_c$=32 columns) may be used for all information block sizes of 3GPP LTE.

Additionally, the evenly distributed RVs can be defined to always start at the tops (i.e., first row) of the columns of the constituent sub-block interleavers if the dummy bits are not discarded prior to defining the starting position of the RVs, thus avoiding complex operations such as division and modulo discussed above.

If $N_c$=32 sub-block interleaver with an inter-column permutation pattern={0, 16, 8, 24, 4, 20, 12, 28, 2, 18, 10, 26, 6, 22, 14, 30, 1, 17, 9, 25, 5, 21, 13, 29, 3, 19, 11, 27, 7, 23, 15, 31} is used, then the same number of columns are used for all $K_{stream}$, with the number of rows changing with $K_{stream}$, $N_r=\lceil K_{stream}/N_c\rceil=\lceil K_{stream}/32\rceil$. Since, the RVs are usually required to divide buffer 307 in approximately even sections additional computational overhead is required to model the unevenness in the RV definition for each stream size if a dummy-removed circular buffer is used.

For further clarity, consider the case when the number of RVs=8, the number of columns in a sub-block interleaver is $N_c=32$, and the input stream size is $K_{stream}$, and a length-32 column permutation is used in the subblock interleaving of S, $P_0$ and $P_1$.

FIG. 6 shows a dummy-removed circular buffer (i.e., after discarding dummy bits) with 8 RVs defined. Note that there are discontinuities wherever dummy bits were discarded; dummy-removed circular buffer in sequence format (may be used in buffer 307) is obtained by reading the matrix elements column-wise from the left top corner onwards. The lack of regularity in RV distribution in the rectangles causes difficulty in HARQ operation where any RV value may be input to the RM block. The row and column indices for the starting point of the RV have to be computed based upon the stream size (and the number of dummy bits), thus leading to complicated hardware.

Figure 7:
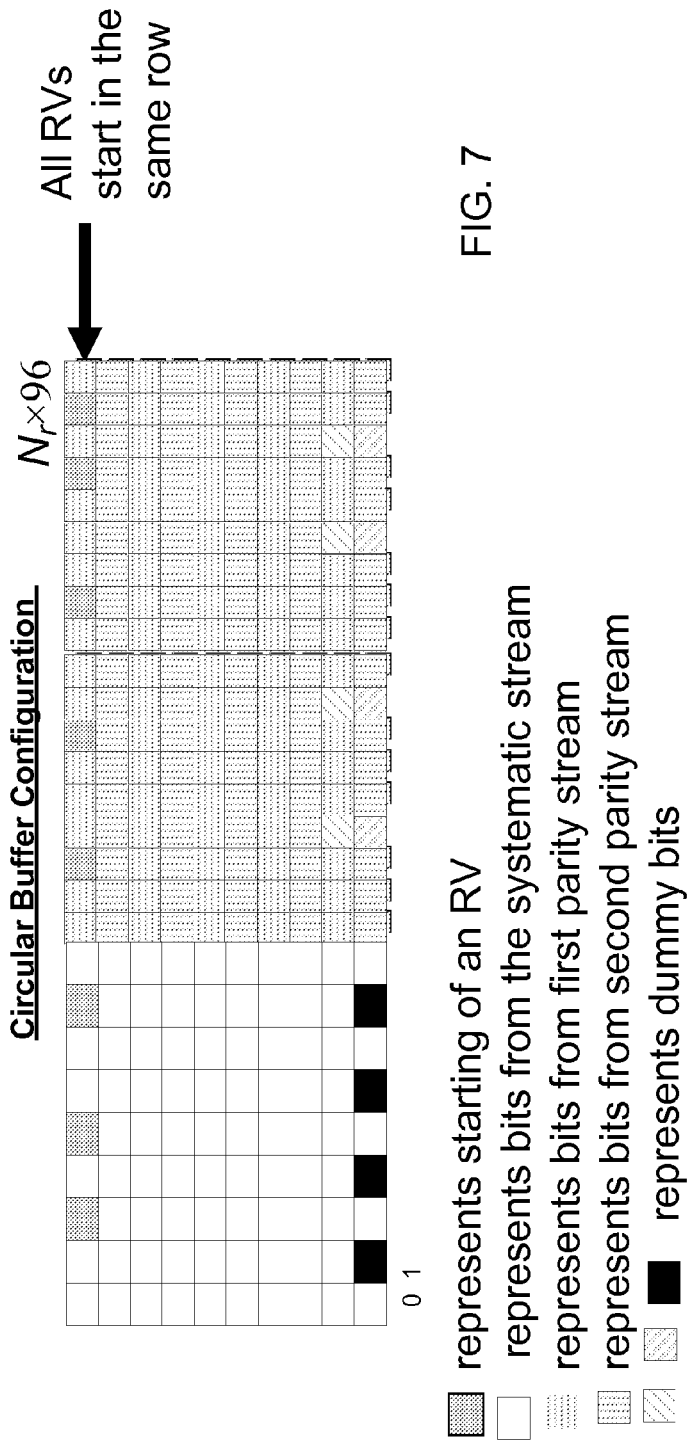
FIG. 7 illustrates redundancy versions circular buffer that has dummy bits.

An alternate way to ease HARQ operation with a circular buffer is described next. In this case, the dummy bits are discarded after the RVs are defined as shown in FIG. 7. In fact, the dummy bits are left in the circular buffer (dummy-padded circular buffer), and since the dummy-padded circular buffer size is a multiple of 8, it is possible to define eight RVs that are equally spaced for any stream size $K_{stream}$. In particular, the eight RVs can be defined to start at the top of a sub-block interleaver column. It is convenient, in general, to assign the RVs to any positions in the first row (i.e., at the top of a column) of the sub-block interleaver. For example, the eight RVs can start at the top of the following eight columns 2, 14, 26, 38, 50, 62, 74, 86 in FIG. 7 (with $N_c=32$). When descried in terms of position in the dummy-padded circular buffer of sequence format, the redundancy versions start at positions $\lceil K_{stream}/32\rceil(12\times i+\sigma)$, i=0, 1, . . . , 7 where σ indicates the column index of the starting position of the first RV ($RV_0$).

Note that this RV definition is memoryless for a dummy-padded circular buffer, in the sense that it is easy to start outputting the desired code bits from any RV without knowing the starting position of previous RVs. The dummy bits are discarded when the bits are being read out of the dummy-padded circular buffer. Even if the total number of columns is NOT a multiple of total number of RVs supported, e.g., $N_c=30$ with 8 RVs, the RVs can still be defined to start at the top of any 8 of the 90 columns.

Although the column top is used in the discussion above as a simple way to define starting positions of the RVs, other convenient positions may be used as well. For example, the starting positions of the RVs are all located in a particular row r of the dummy-padded circular buffer, where $0\leq r<N_r$.

The justification for defining RVs over the dummy-padded circular buffer is given below.

The permutation of each stream (or sub-block interleaver) is described as $K_{rect}=N_r\times N_c$ rectangular array with dummy bits.

When $K_{steam}=N_r\times N_c$, the bits of each stream are written into the rectangle row-wise and read out column-wise (after column permutation).

When $K_{steam}<N_r\times N_c$ the bits of each stream are written into the rectangle row-wise and read out column-wise, and $(N_r\times N_c-K_{stream})$ dummy bits are padded to completely fill up the rectangle. The dummy bits are deleted or "pruned" before transmission over the channel.

It should be noted that when the rectangle is full (dummy bits used or not), the permutation of each stream has a closed-form expression, which means it is easy to determine the inverse permutation. If it is easy to determine the inverse permutation, it is therefore also easy to determine the position in the encoder output stream corresponding to a particular RV. If the rectangle is partially filled (no dummy bits and $K_{stream}<N_r\times N_c$), the permutation of each stream does not have a closed-form expression. In this case, it is difficult to determine the inverse permutation, and therefore also difficult to determine the position in the encoder output stream corresponding to a particular RV.

Figure 8:
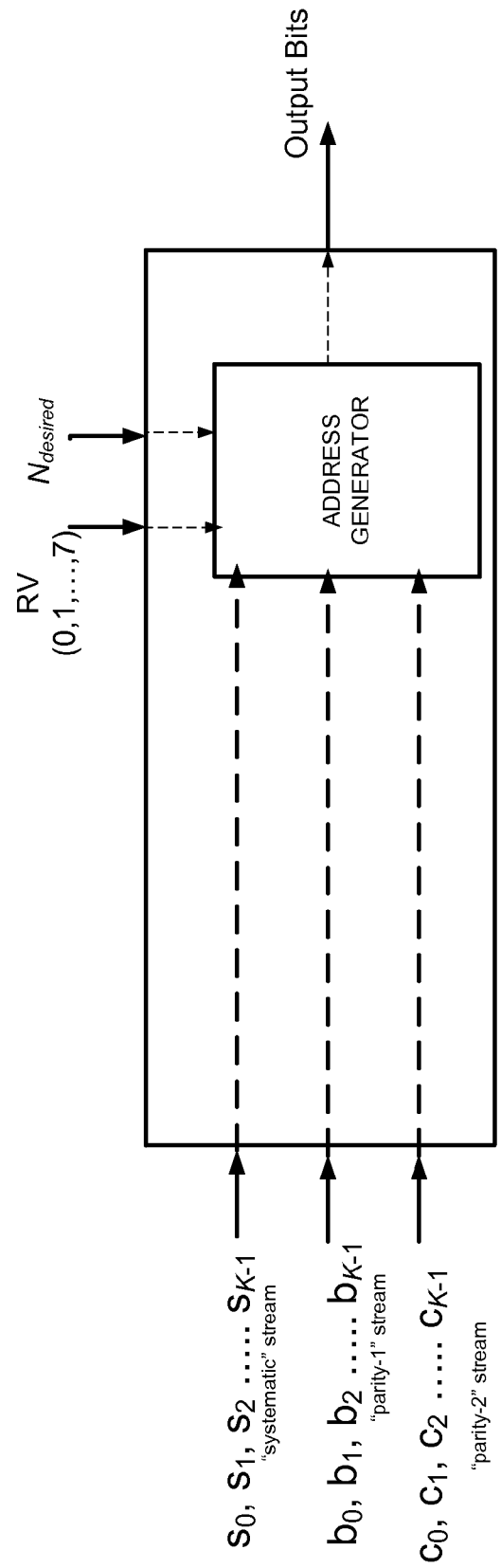
FIG. 8 illustrates the use of a virtual circular buffer.

For ease of explanation, in the discussions above, it is assumed that the circular buffer 307 (dummy-removed or dummy padded) is physically formed, for example, by storing the bits of the circular buffer in a memory. For hardware implementation, it is better to utilize the virtual circular buffer concept that directly generates the desired output bits without forming the physical circular buffer 307. In other words, the rate matching functionality is fulfilled without the intermediate storage. This concept is shown in FIG. 8.

The intermediate step of forming the physical circular buffer can be avoided by finding an algebraic rule to easily generate a desired portion of the physical circular buffer without having to go through the entire physical circular buffer formation process.

In the virtual circular buffer, the rate matching algorithm initializes its address generator to an appropriate starting value based on the input parameters (RV number and input size). Then it directly starts outputting the bits by following the address generation rule as described by the sub-block permutations of the input streams. The address generation rule defines the sequence of positions in the encoder output stream from which the bits are outputted.

The virtual circular buffer can be operated as both a dummy-padded circular buffer and a dummy-removed circular buffer. However, if a dummy-removed circular buffer is used, then the RVs may start anywhere in the circular buffer (in the matrix format) as illustrated in FIG. 6. Hence, in such a scenario, the RV starting points may need to be explicitly stored, costing memory. Alternatively, the RV starting points may be derived for each case but the address initialization in the virtual circular buffer operation becomes complicated to implement in hardware.

In contrast, to operate the virtual circular buffer when a dummy-padded circular buffer is utilized, the RVs start at the top of the sub-block interleaver columns and hence the address initialization in the virtual circular buffer operation becomes more efficient. Whenever the address generator points to a dummy bit, the address generator is automatically advanced without outputting a bit.

RV DEFINITION WITH 1ST STAGE RATE MATCHING

A 1st stage rate matching technique may be needed when the receiver has a limited amount of soft buffer size. In the 1st stage rate matching, the transmitter may have knowledge of the soft buffer capability of the receiver, and hence it is permitted to only transmit no more code bits than can be stored in the receiver's soft buffer.

Figure 9:
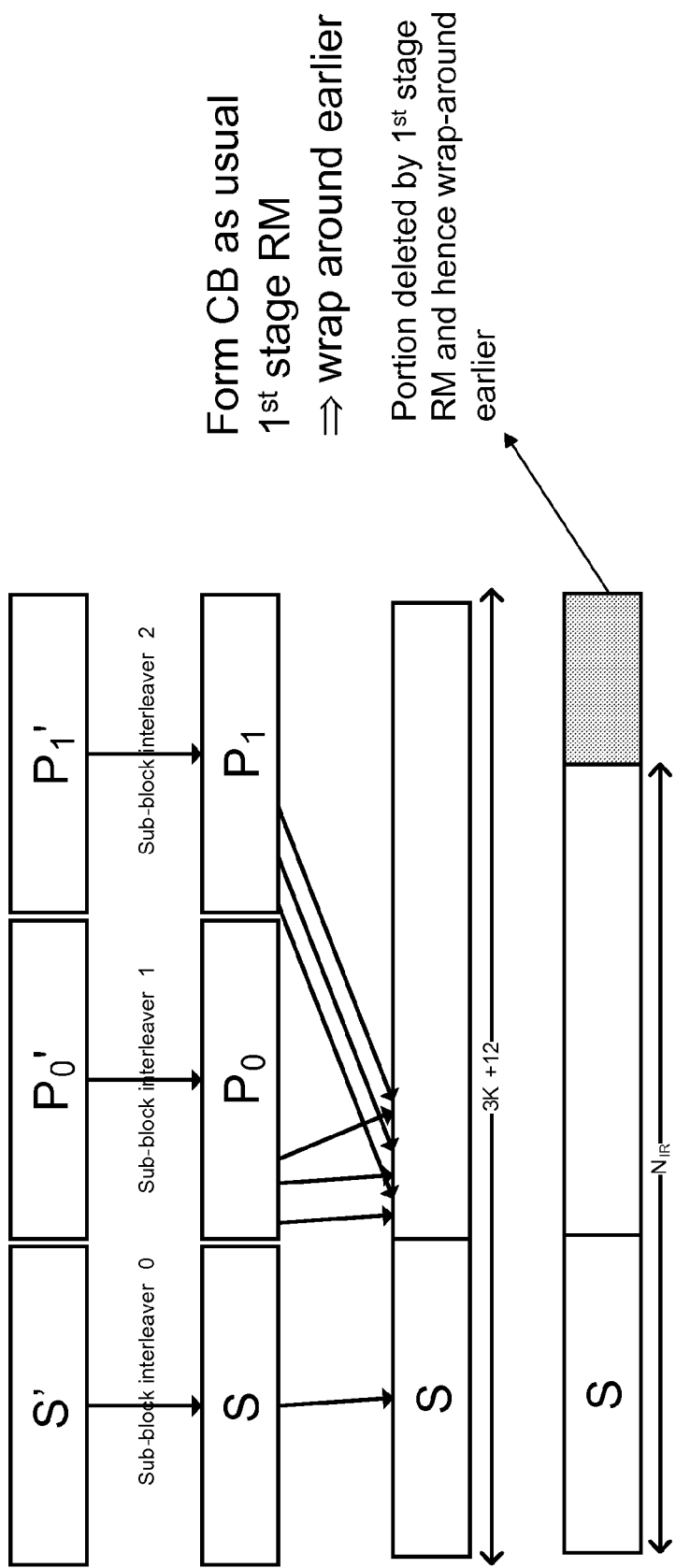
FIG. 9 illustrates a first-stage rate matching with circular buffering.

The maximum soft buffer size may impose a certain constraint on the rate matching with the circular buffer. In particular, the circular buffer for each code block may be further limited as shown in FIG. 9. In this case, the wrap around in the circular buffer may happen at an earlier point than the end of the circular buffer.

In general, if the input (Transport block or concatenated Transport block) to the turbo coder is larger than the maximum size supported by the turbo interleaver, then the TB is segmented into multiple code block segments, each of which is individually turbo-encoded and rate-matched, thus allowing a pipelined operation. Therefore, each segment of the TB may have its own circular buffer (or virtual circular buffer) (Note that it is not necessary to create physical circular buffers for each segment.). Let us assume that $N_{IR}$ is the total soft buffer size per HARQ process (or max buffer size corresponding to a TB).

If the rate matching is performed on a codeword-by-codeword (i.e., segment by segment) base, it is preferable that $1^{st}$ stage rate matching, if included, will be performed on a codeword-by-codeword (segment-by-segment) basis as well. The circular buffer size for each code word (or segment) is limited to $N_{cw}$, where $N_{cw} < 3 \times K_{stream}$, and $3 \times K_{stream} = 3 \times K_{info} + 12$ is the full circular buffer size (per-segment) before $1^{st}$ stage rate matching. Note that when $N_{cw} \geq 3 \times K_{stream}$, the first stage RM (per segment) is transparent. The summation of size $N_{cw}$ for all codewords (from all transport blocks) cannot exceed $N_{IR}$, which is the soft buffer size of all TBs. Instead of taking $N_{IR}$ as input to the $1^{st}$ stage RM algorithm, the $1^{st}$ stage RM of the per code word RM in LTE can take $N_{cw}$ as input.

Options for 1st stage rate matching may include:
1. Limiting the buffer size to a set maximum value for the UE class (over all TBs, all codewords of a given TTI. A User Equipment (UE) class defines a set of transmitter/receiver capabilities in 3GPP and 3GPP LTE.). Determine the per TB and per codeword limit from $N_{IR}$ via scaling. For example, $N_{cw} = \text{floor}(N_{IR}/C)$, where C is the number of turbo codewords for the concatenated TBs, determined by the code block segmentation rule. It is possible to determine per-codeword limit in a manner similar to the code-block segmentation rule.
2. Limiting the buffer to a set maximum value $N'_{IR}$ for the UE class (set the limit per TB). Determine the per codeword limit from this maximum via scaling.
3. Limiting the buffer to a set maximum value per codeword for the UE class.

With any of these three options, the per codeword limit may be defined by deleting entire columns from the virtual circular buffer (in individual segments).

For RV definitions, the choices include:
Scheme 1. Only allow a subset of possible RVs. If Y RVs are defined without $1^{st}$ stage rate matching (i.e., $1^{st}$ rate matching is transparent), then Y' RVs out of the Y available RVs may be kept when $1^{st}$ stage rate matching is not transparent, $Y' \leq Y$. For example, RV-i, i=0, 1, ..., Y'-1, are used, where starting point of RV-Y' is less than $N_{cw}$.
Scheme 2. Redefine the RVs such that a full set of Y RVs is available inside the allowed maximum circular buffer size. The RVs are redefined such that they start at top of columns of the circular buffer with dummy bits inserted. The amount of systematic bit puncturing is unchanged, such that RV 0 starts in the same position for all UE classes. For example, if $N_{col}$ columns of the dummy-padded circular buffer (containing $3 \times N_c$ columns before $1^{st}$ stage rate matching) remain after $1^{st}$ stage rate matching, then the Y RVs can start at column tops of column index $\text{floor}((N_{col}-2)/Y) \times i+2$, i=0, 1, ..., Y-1.

The RV starting points can also be defined on a per-codeword basis although it is preferable to signal a single RV per TB for efficient HARQ operation.

Systematic Bit Puncturing

The RV definition discussed above can be refined to accommodate a performance-enhancing technique called systematic puncturing.

It is well-known in literature that partially systematic turbo codes can outperform systematic turbo codes, one simple explanation being that the latter is a subset of the former. However, systematic bit puncturing is not used in rate matching algorithms in existing wireless standards such as WCDMA or CDMA2000 turbo coding. A primary reason for this being that the transmission (at $RV_0$) are preferred to be self-decodable when the effective coding rate is high.

Systematic bit puncturing is used to avoid excessive puncturing of parity bits, which would otherwise lead to poor minimum distances at higher coding rates and therefore inferior performance.

In communication systems such as 3GPP, coding rates may perhaps be as high as 5/6 (or even higher) and hence such systems should be able to handle a small fraction of puncturing of systematic bits. Note such partially systematic codes are still self-decodable. For a turbo code with block size $K_{info}$, let $\Delta K(R)$ denote the fraction of systematic bits that are punctured at code rate R.

Figure 10:
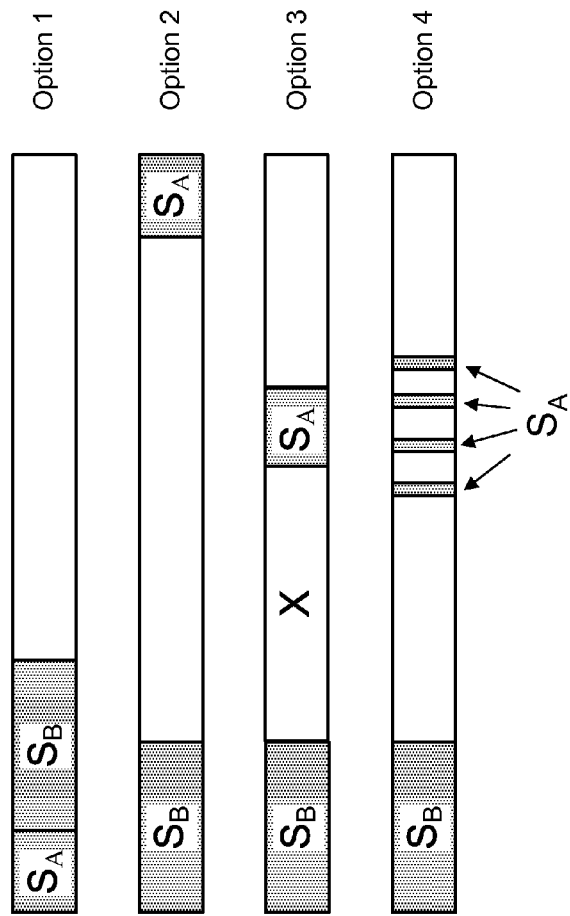
FIG. 10 illustrates systematic bit puncturing.

One challenge in designing rate-matching is then to find optimal values of $\Delta K(R)$ for all valid combinations of $K_{info}$ and R. After $\Delta K(R)$ is determined, the circular buffer can be re-configured to include systematic bit puncturing. There are many options for reconfiguration as shown in FIG. 10. In discussion of systematic puncturing, the circular buffer in sequence format is used to illustrate the techniques, and the circular buffer can be dummy-padded or dummy-removed. In the following examples, it is assumed that the mother code rate is 1/3, and the bits are always taken sequentially starting from the first bit in the circular buffer. As mentioned, $K_{info}$ denotes information block size, $K_{stream}$ denotes the length of a stream.

1. Option 1 in FIG. 10 describes the normal circular buffer in sequence format where all systematic bits are transmitted first, followed by some or all parity bits.
2. Option 2 in FIG. 10 contains the same bits as the normal circular buffer, but the circular buffer is modified; some of the systematic bits ($S_A$) are taken from the systematic portion of the circular buffer and placed at the end of the buffer. Therefore, in the first transmission, the systematic bits in $S_A$ are punctured at many of the code rates. Option 2 may also be achieved by simply placing $RV_0$ at the start at a position with an offset relative to the beginning of the circular buffer. This offset may be determined based on the amount of systematic bit puncturing required. For code rate $R >= K_{info}/(3 \times L - S_A)$, systematic bits in $S_A$ are always punctured.
3. Option 3 is same as Option 2 in that the circular buffer is modified; However, the systematic bits ($S_A$) taken from the systematic portion of the circular buffer are placed in the buffer after X bits from the parity streams. Therefore, in the first transmission, some of the systematic bits are punctured at many of the code rates. For code rate $R >= K_{info}/(S_B+X)$, systematic bits in $S_A$ are always punctured.
   a. From code rate $K/(S_B+X) > R > K_{info}/(S_B+X+S_A)$, part of systematic bits in $S_A$ are punctured.
   b. For code rates $K_{info}/(S_B+X+S_A) >= R$, all systematic bits are transmitted.

4. Option 4 is same as Option 3 in that the circular buffer is modified. However, the systematic bits ($S_A$) taken from the systematic portion of the circular buffer are distributed in the buffer in a certain range. Therefore, in the first transmission, some of the systematic bits are punctured at many of the code rates. Option 4 allows more flexibility in the design of a circular buffer, optimizing the systematic puncturing ratio $\Delta K(R)$. For example, systematic bits in $S_A$ may be evenly distributed within a range; or they are distributed in increasing density of systematic bits within a range; or they are distributed in decreasing density of systematic bits within a range.

Other variations to the options listed above exist. For example, systematic bits in $S_A$ may not be located in the front of the subblock interleaved systematic stream S', rather in the middle or at the end of S'. It may also be taken from discontinuous locations of S', such as one bit for every x bits of S', x>1.

Though the new modification is shown as an additional step performed after forming the circular buffer, this step could be combined directly into the definition of the circular buffer.

The different options have different complexity/performance tradeoffs. Option 2 may not be preferable as the systematic bit puncturing is fixed for all the rates almost close to 1/3. Simulations suggest that for LTE, systematic bit puncturing of around 5% may be preferred for high rates such as 3/4 or 5/6, while 0% is preferred for lower coding rates such as 2/3 or 1/2. Therefore, it may be preferable to place the systematic bits in portions of the buffer as dictated by such reasons. Alternatively, it has been suggested to use $RV_7$ at low coding rates to switch off systematic bit puncturing.

Although the discussion focuses on rate matching design for the first transmission (thus FEC), the same reconfigured circular buffer can be used in the context of HARQ with multiple transmissions per information block. Different redundancy versions for HARQ transmission may be obtained by taking different sections of the reconfigured circular buffer, where the section size is equal to the length required for the current physical channel transmission. In particular, if Y redundancy versions (RV) are needed, a simple way to define Y different starting points $(A_0, A_1, \ldots, A_{Y-1})$ within the reconfigured circular buffer, one for a redundancy version. For $RV_i$, the bits are taken from $A_i$ to $\mod(A_i+N_{tx}, N_{CB})$, where $i=0, 1, \ldots, Y-1$, and $N_{tx}$ is the number of bits required for transmission, $N_{CB}$ is the length of the circular buffer. In other words, $N_{tx}$ bits are read starting with position $A_i$, wrap around to the beginning of the circular buffer if the end the buffer is reached. For a given information block, $N_{tx}$ may be different for each transmission.

RV DEFINITION WITH SYSTEMATIC PUNCTURING

Combining (a), the RV definition based on a dummy-padded circular buffer and (b), systematic puncturing, the improved rate matching design has the following advantages, using $N_c=32$ and mother code rate 1/3 (i.e., three streams out of turbo encoder 101) for illustration:

Dummy bits included in the circular buffer to ease RV definition (i.e., dummy-padded circular buffer).

Easy to start each RV for HARQ retransmissions. For example, the RVs are defined to start at the top (i.e., first row) of the sub-block interleaver columns in the circular buffer of matrix format. More specifically, If 8 RVs need to be defined, $RV_i$ would start with position $N_r \times (N_c \times 3/8 \times i + \sigma) = N_r \times (12 \times i + \sigma) = \lceil K_{stream}/32 \rceil (12 \times i + \sigma)$, $i=0, 1, \ldots, 7$, in dummy-padded circular buffer of sequence format. In matrix format, $RV_i$ starts at the top of $(12 \times i + \sigma)$-th column.

If only 4 RVs are defined, each RV starts at the top of the $(24 \times i + \sigma)$-th column (with $\sigma=2$). Equivalently, in sequence format, $RV_i$ starts with bit position $N_r \times (N_c \times 3/4 \times i + \sigma) = N_r \times (24 \times i + \sigma) = \lceil K_{stream}/32 \rceil (24 \times i + \sigma)$, $i=0, 1, \ldots, 3$.

Figure 11:
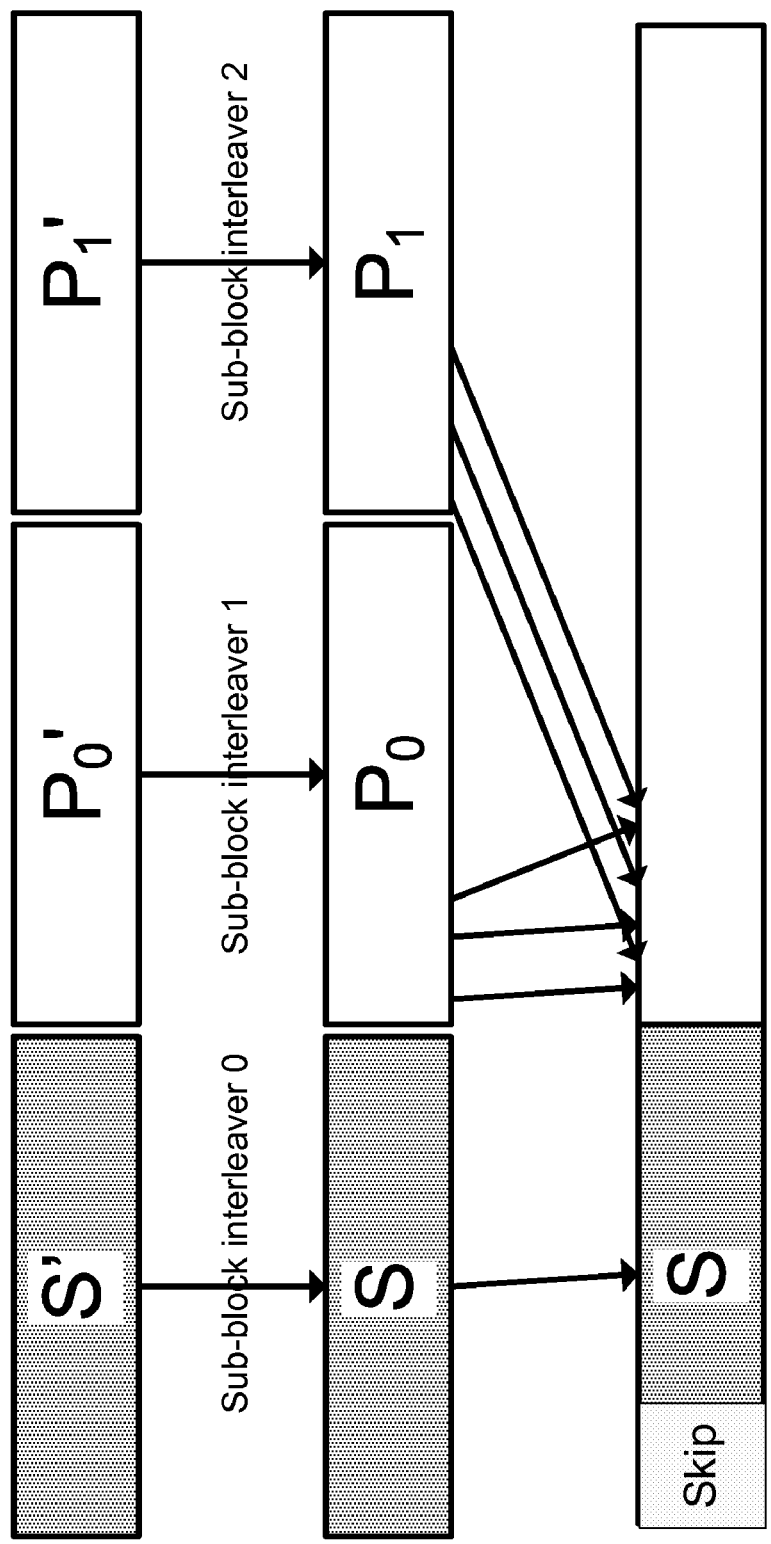
FIG. 11 illustrates the skipping of a small portion of systematic bits within a circular buffer.

When $\sigma=0$ (modulo $3 \times N_c$), $RV_0$ (i.e., i=0) would start at the beginning of the circular buffer, thus no systematic bit puncturing. The systematic bit puncturing can be switched on by setting $\sigma$ to be a value greater than 0 (modulo $3 \times N_c$) for 3 streams (i.e., mother code rate 1/3), thus skipping a small fraction of systematic bits when reading out bits for $RV_0$. In other words, $RV_0$ (the first redundancy version) is defined to start at the top of $\sigma$-th column, where $\sigma$ is the number of offset columns. This is shown in FIG. 11. For example, $RV_0$ may be defined to start from column #2 instead of column #0 by setting $\sigma=2$. Other values of $\sigma$ can also be considered.

The improved design discussed above may have several variations. Some of which follow:

Although 32 columns are used in the proposed design, other values, especially powers of 2 such as 8, 16, 64 or 128, can be used as $N_c$.

Although a particular column permutation is used in the design example, other permutation can be used to permute the columns as well.

If two or more $N_c$ are used in the rate matching design, then each $N_c$ can be used for numerous interleaver sizes.

The subblock interleaver may not be the same for all the streams. For example, the subblock interleaver can be the same for both systematic and parity 1 streams, but the subblock interleaver of parity 2 stream can be different.

Although for ease of description, the RVs are defined to start at the tops of the sub-block interleaver columns, they can also be defined to start at other convenient locations in the dummy-padded circular buffer. For example, all the RVs may start in the same row r of the constituent sub-block interleavers, where $0 \leq r < N_r$.

RV DEFINITION WITH $1^{ST}$ STAGE RATE MATCHING AND SYSTEMATIC PUNCTURING

When both systematic puncturing and $1^{st}$ stage rate matching are used, the RV definition may need to be modified to meet the following requirements:

Ease of RV definition by including dummy bits in the circular buffer (i.e., dummy-padded circular buffer).

Ease of starting the address generation for each RV for HARQ retransmissions. For example, the RVs could be defined to start at the tops of the sub-block interleaver columns (i.e., the first row in a sub-block interleaver column) in the circular buffer of matrix format.

Keeping the starting positions of the RVs within range of the circular buffer limits after $1^{st}$ stage rate matching.

When both systematic puncturing and $1^{st}$ stage rate matching are used, the implementation may be illustrated as follows. First, the $1^{st}$ stage RM is achieved by deleting one or more columns (preferably from the last column of the virtual circular buffer) from the circular buffer to form a shortened circular buffer. Thus systematic bits can be punctured by defining the first redundancy version to start at a position with an offset relative to the beginning of the shortened circular buffer. In other words, the systematic bit puncturing may be achieved by defining $RV_0$ at a certain non-zero column number in the sub-block interleaver of the systematic sub-block interleaver. Note that above steps can be combined directly also. Again, the first stage rate-matching may be considered to applied on a per-codeword (or per segment) basis. For convenience, the shortened circular buffer is also referred to as circular buffer after $1^{st}$ stage rate matching is applied. This distinction should be clear from the context.

For example if 8 RVs is used as the baseline (when $1^{st}$ stage RM is absent), then the following options are available for defining RVs with $1^{st}$ stage RM.

With RV definition Scheme 1, the 8 RV starting positions may be kept but not necessarily used always. Only the original RV starting positions that lie within the range $(0 \leq j \leq N_{cw}-1)$ in the circular buffer may be allowed. This can also be stated using the following condition: only RV-i with $N_r \times \sigma <= N_r(12 \times i + \sigma) <= N_{cw}-1$ are used, resulting in possibly fewer than 8 RVs in some cases. The last RV index i allowed is thus $\text{floor}(((N_{cw}-1)/N_r-\sigma)/12)$.

With RV definition Scheme 2, 8 RVs are still needed (in all cases), then RV starting positions can be $N_r(C \times i + \sigma)$, $i=0, 1, \ldots, 7$, where C is the maximum integer such that $N_r(C \times i + \sigma) <= N_{cw}-1$. In other words, $C=\text{floor}(((N_{cw}-1)/N_r-\sigma)/7)$.

In the discussion above, C indicates the number of columns between two adjacent RVs, Y is the number of RVs defined.

Similar RV modification can be applied if other number (e.g., 4) of RVs are defined before $1^{st}$ stage rate matching. For example if 4 RVs is used as the baseline (when $1^{st}$ stage RM is absent), then the following options are available for defining RVs with $1^{st}$ stage RM.

Without $1^{st}$ stage rate matching, RV-i starts with position $N_r \times (N_c \times \frac{3}{4} \times i + \sigma) = N_r \times (24 \times i + \sigma)$, $i=0, 1, 2, 3$, in dummy-padded circular buffer of sequence format. After $1^{st}$ stage rate matching is used, the circular buffer contains bits of position j, where $0 \leq j \leq N_{cw}-1$.

With RV definition Scheme 1, the 4 RV starting positions are kept, then only RV-i with $N_r \times 2 <= N_r \times (24 \times i + \sigma) <= N_{cw}-1$ are used, resulting in possibly fewer than 4 RVs.

With RV definition Scheme 2, 4 RVs are still needed, then RV starting positions can be $N_r \times (C \times i + 2)$, $i=0, 1, 2, 3$, where C is the maximum integer such that $N_r \times (C \times i + \sigma) <= N_{cw}-1$.

FIG. 12 is a flow chart showing operation of the transmitter of FIG. 3. In particular, the logic flow of FIG. 12 shows the steps for assigning redundancy versions to circular buffer 307, and the subsequent transmission of bits from circular buffer 307. The logic flow begins as step 1201 where logic circuitry 305 receives systematic bits, a first block of parity bits, and a second block of parity bits. These bits are output from encoder 301. As discussed above, the systematic bits, the first block of parity bits, and the second block of parity bits all comprise dummy bits. Logic circuitry 305 individually block interleaves the systematic bits, first block of parity bits, and second block of parity bits using interleaver 309 (step 1203). At step 1205, logic circuitry 305 interlaces the first block of parity bits with the second block of parity bits and prepends the interleaved systematic bits to the interlaced parity bits to create circular buffer 307. At step 1207, logic circuitry 305 then defines redundancy versions within a particular row of the circular buffer. In one embodiment of the present invention, the particular row comprises the top row of the circular buffer, for example, 8 or 4 sub-block interleaver column tops. Logic circuitry 305 receives a redundancy version and a number of desired bits (step 1209) and outputs to a transmitter the number of desired bits starting at the RV bit position (step 1211).

FIG. 13 is a flow chart showing operation of the transmitter of FIG. 3. In particular, the logic flow of FIG. 13 shows the steps for assigning redundancy versions to a virtual circular buffer, and the subsequent transmission of bits from the virtual circular buffer. The logic flow begins as step 1301 where logic circuitry 305 receives systematic bits, a first block of parity bits, and a second block of parity bits. As discussed above, the systematic bits, the first block of parity bits, and the second block of parity bits all comprise dummy bits. Logic circuitry 305 individually block interleaving the systematic bits, first block of parity bits, and second block of parity bits using interleaver 309 (step 1303). At step 1305, logic circuitry 305 interlaces the first block of parity bits with the second block of parity bits and prepends the interleaved systematic bits to the interlaced parity bits. At step 1307, logic circuitry 305 then defines redundancy versions corresponding to bit positions within a stream of data, and where all possible RVs are at positions $[K_{stream}/32](13 \times i + \sigma)$, $i=0, 1, \ldots, 7$ and where $\sigma$ indicates the column index of the starting position of the first RV ($RV_0$). The stream of data comprises the interleaved systematic bits, and an interlaced first block of interleaved parity bits and second block of interleaved parity bits. Logic circuitry 305 receives a redundancy version and a number of desired bits (step 1309) and outputs to a transmitter the number of desired bits starting at the RV bit position (step 1311).

While the invention has been particularly shown and described with reference to a particular embodiment, it will be understood by those skilled in the art that various changes in form and details may be made therein without departing from the spirit and scope of the invention.

In one example, although the procedure is explained the dummy bits may not be added to the streams and later removed from the circular buffer, rather the same effect is realized by other ways such as generating the addresses properly.

In another example, starting RVs from a particular row (e.g., column tops) of the circular buffer can be equivalent to start RVs from a particular row in the subblock interleavers for each stream while dummy bits are present. Mapping the starting points to their location within the subblock interleaver may be more convenient for certain implementation, while defining the RV starting points in the circular buffer may be more convenient for other implementations.

It is intended that such changes come within the scope of the following claims.

The invention claimed is:

1. A method for assigning redundancy versions to a circular buffer of a transport block, the method comprising the steps of:

segmenting a transport block into multi code block segments;

encoding a segment associated with transport block with an encoder to generate a systematic bit stream and two parity bit streams;

inserting dummy bits in each stream to generate systematic bits, a first block of parity bits, and second block of parity bits, wherein the systematic bits, the first block of parity bits, and the second block of parity bits all comprise dummy bits;

individually block interleaving the systematic bits, first block of parity bits, and second block of parity bits;

interlacing the first block of parity bits with the second block of parity bits to create interlaced parity bits;

pre-pending the interleaved systematic bits to the interlaced parity bits to create a circular buffer;

determining a buffer size of a shortened circular buffer per segment based on $\text{floor}(N_{IR}/C)$, where C is the number of segments for the Transport block, determined by the code block segmentation rule and wherein $N_{IR}$ is the total soft buffer size per Hybrid Automatic Repeat reQuest process;

receiving a redundancy version (RV) and a number of desired bits; and outputting from the shortened circular buffer the number of desired bits starting at the RV position.

2. The method of claim 1, wherein the step of outputting the bits starting at the RV position includes a wrap around to the beginning of the circular buffer at an earlier point than the end of the circular buffer.

3. The method of claim 1 wherein the RVs are defined such that a full set of 4 RVs is available inside the shortened circular buffer.

4. A method for assigning redundancy versions to a circular buffer of a transport block, the method comprising the steps of:

segmenting a transport block into multi code block segments, encoding a segment associated with transport block with an encoder to generate a systematic bit stream and two parity bit streams;

rate matching the systematic bit stream and two parity streams to create a circular buffer;

determining a buffer size per segment based on floor($N_{IR}$/C), where C is the number of segments for the Transport block, determined by the code block segmentation rule and wherein $N_{IR}$ is the total soft buffer size per Hybrid Automatic Repeat reQuest process;

shortening the circular buffer based on the buffer size per segment;

receiving a redundancy version (RV) and a number of desired bits; and outputting from the shortened circular buffer the number of desired bits starting at the RV position.

5. The method of claim 4, wherein the step of outputting the bits starting at the RV position includes a wrap around to the beginning of the circular buffer at an earlier point than the end of the circular buffer.

6. The method of claim 4 wherein the RVs are defined such that a full set of 4 RVs is available inside the shortened circular buffer.

7. A method for assigning redundancy versions to a circular buffer, the method comprising the steps of:

receiving systematic bits, a first block of parity bits, and a second block of parity bits, wherein the systematic bits, the first block of parity bits, and the second block of parity bits all comprise dummy bits;

individually block interleaving the systematic bits, first block of parity bits, and second block of parity bits;

interlacing the first block of parity bits with the second block of parity bits to create interlaced parity bits;

pre-pending the interleaved systematic bits to the interlaced parity bits to create a circular buffer;

defining redundancy versions to start in a particular row of the circular buffer;

receiving a redundancy version (RV) and a number of desired bits; and outputting the number of desired bits starting at the RV bit position.

8. The method of claim 7, wherein the step of deleting the one or more columns comprises deleting columns from the last column of the circular buffer.

9. The method of claim 7, wherein the step of deleting the one or more columns comprises a step of determining a buffer size per segment based on floor($N_{IR}$/C), where C is the number of segments for the Transport block, determined by the code block segmentation rule and wherein $N_{IR}$ is the total soft buffer size per Hybrid Automatic Repeat reQuest process.

10. The method of claim 7 wherein the step of defining redundancy versions to start in a particular row of the circular buffer comprises the step of defining redundancy versions to start at column tops of the circular buffer.

11. The method of claim 10 wherein the step of defining redundancy versions to start at column tops of the circular buffer comprises the step of defining redundancy versions to start at 8 column tops of the circular buffer.

12. The method of claim 10 wherein the step of defining redundancy versions to start at column tops of the circular buffer comprises the step of defining redundancy versions to start at 4 column tops of the circular buffer.

13. The method of claim 7 further comprising the step of puncturing the systematic bits by defining the first redundancy version to start at a position with an offset relative to a beginning of the circular buffer.

14. The method of claim 13 further comprising the step of defining a first redundancy version to start at the top of σ-th column, where σ is the number of offset columns.

15. The method of claim 7 further comprising the step of deleting one or more of columns from the circular buffer to form a shortened circular buffer.

16. The method of claim 15 further comprising the step of defining redundancy versions to start at column tops of the shortened circular buffer.

17. The method of claim 15 further comprising the step of puncturing systematic bits by defining the first redundancy version to start at a position with an offset relative to the beginning of the shortened circular buffer.

18. An apparatus comprising:

an encoder outputting systematic bits, a first block of parity bits, and a second block of parity bits;

rate matching circuitry receiving the systematic bits, first block of parity bits, and second block of parity bits and creating a circular buffer having dummy bits, and wherein a particular row of the circular buffer contains starting points of the redundancy versions (RVs), and wherein the rate matching circuitry outputs non-dummy bits from the circular buffer to a transmitter starting at a particular RV;

transmission circuitry receiving the non-dummy bits and transmitting the non-dummy bits.

19. The method of claim 18 wherein the particular row comprises the top row of the circular buffer.

20. The apparatus of claim 18 wherein 8 column tops of the circular buffer are defined as a starting position for a redundancy version (RV).

21. The apparatus of claim 18 wherein 4 column tops of the circular buffer are defined as a starting position for a redundancy version (RV).

22. The apparatus of claim 18 wherein the circular buffer comprises interleaved systematic bits, interleaved and interlaced first and second block of parity bits.

23. The apparatus of claim 22 wherein the rate matching circuitry punctures systematic bits by defining the first redundancy version to start at a position with an offset relative to the beginning of the circular buffer.

24. The apparatus of claim 22 wherein the rate matching circuitry starts a first redundancy version at a top of σ-th column, where σ is a number of offset columns.

25. The apparatus of claim 18 wherein the rate matching circuitry deletes one or more of columns from the circular buffer to form a shortened circular buffer.

26. The apparatus of claim 25 wherein the rate matching circuitry defines redundancy versions to start at column tops of the shortened circular buffer.

27. The apparatus of claim 26 wherein the rate matching circuitry punctures systematic bits by defining the first redundancy version to start at a position with an offset relative to the beginning of the shortened circular buffer.

28. The apparatus of claim 18, wherein the rate matching circuitry outputs the bits starting at the RV position including a wrap around to the beginning of the circular buffer at an earlier point than the end of the circular buffer.

29. The apparatus of claim 18, wherein the rate matching circuitry deleting the one or more columns comprises deleting columns from the last column of the circular buffer.

30. The apparatus of claim 18, wherein the rate matching circuitry determines a buffer size per segment based on floor ($N_{IR}/C$), where C is the number of segments for the Transport block, determined by the code block segmentation rule and wherein $N_{IR}$ is the total soft buffer size per Hybrid Automatic Repeat reQuest process.

31. An apparatus comprising:
an encoder outputting systematic bits, a first block of parity bits, and a second block of parity bits, each of length $K_{stream}$;
rate matching circuitry receiving the systematic bits, first block of parity bits, and second block of parity bits and individually interleaving the systematic bits, first block of parity bits, and second block of parity bits;
logic circuitry defining redundancy versions (RV) corresponding to a bit position within a stream of data to start outputting data, and wherein the RVs start at positions $\lceil K_{stream}/32 \rceil (C \times i + \sigma)$, i=0, 1, ..., Y−1 and
where C indicates the number of columns between two adjacent RVs, Y is the number of RVs defined, σ indicates the column index of the starting position of the first RV ($RV_0$), and
wherein the stream comprises the interleaved systematic bits, and an interleaved and interlaced first and second block of parity bits, and dummy bits; and
transmission circuitry receiving non-dummy bits starting at a particular RV and transmitting the non-dummy bits.

* * * * *